April 15, 1952
S. J. BUDLANE ET AL
2,593,392
ELECTRIC DEEP FAT FRYER
Filed Nov. 28, 1949
2 SHEETS—SHEET 2
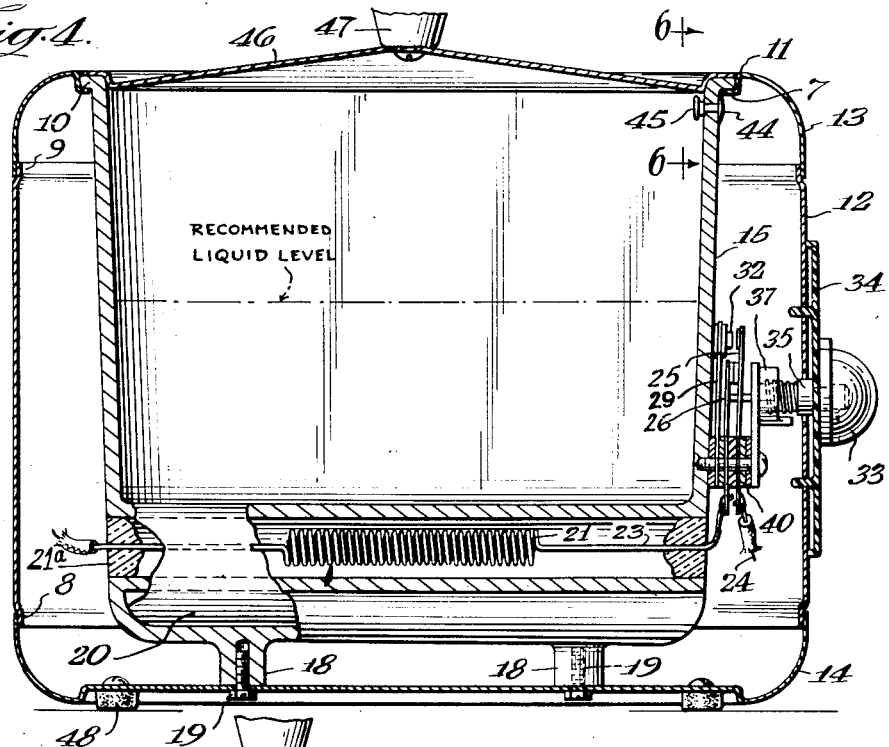
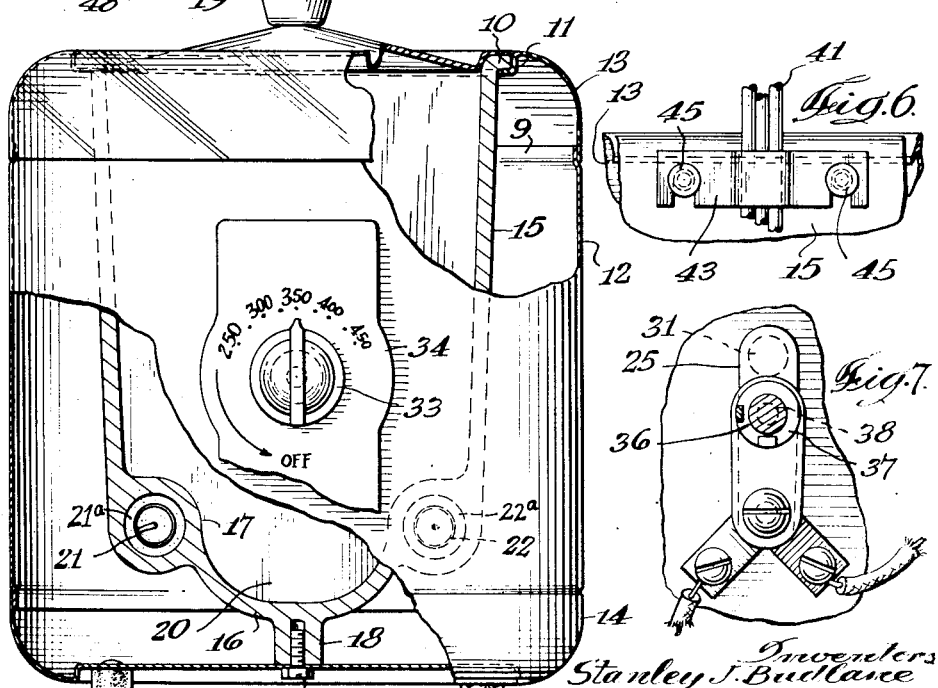

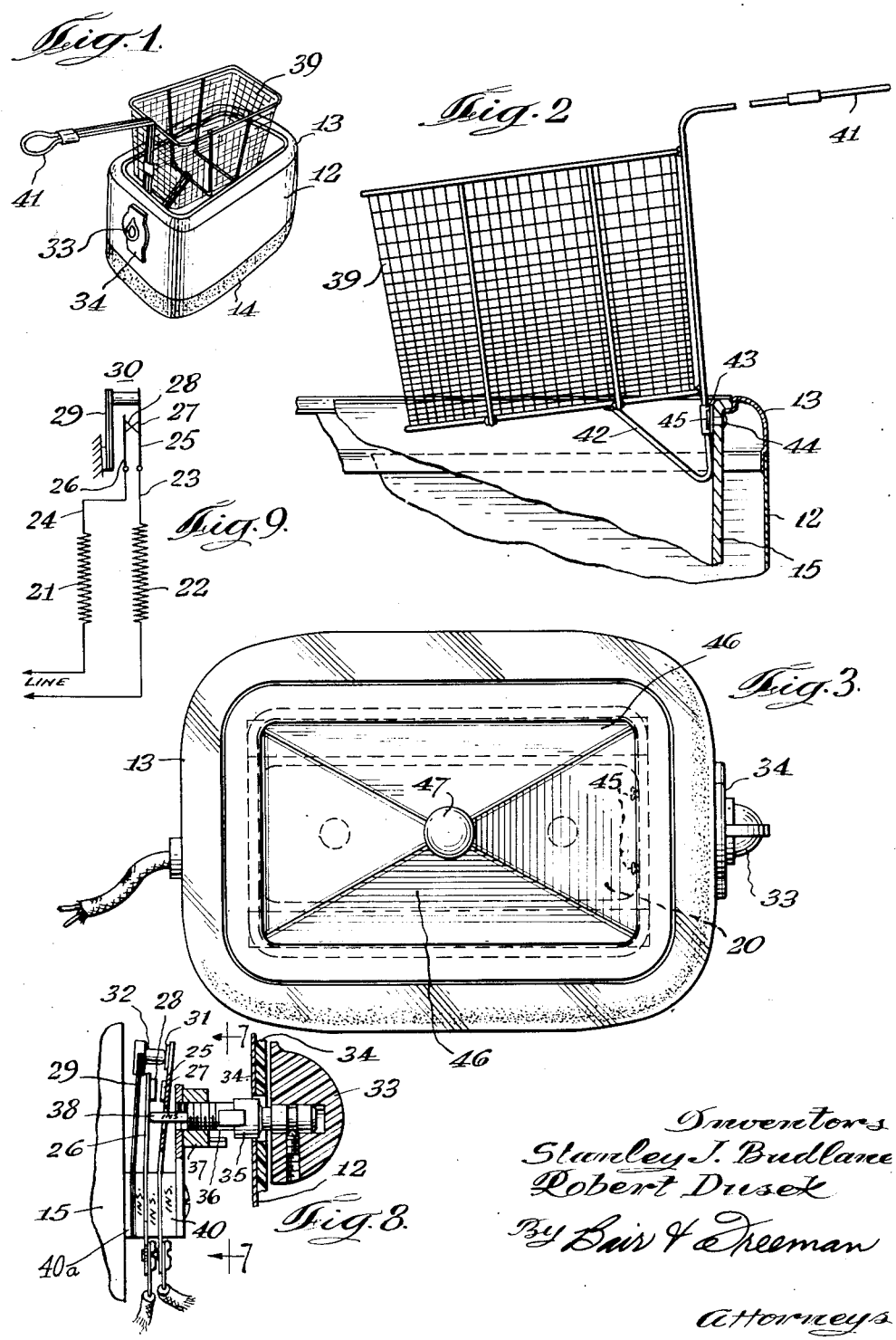

Patented Apr. 15, 1952

2,593,392

UNITED STATES PATENT OFFICE 2,593,392

ELECTRIC DEEP FAT FRYER

Stanley J. Budlane and Robert Dusek, Chicago, Ill., assignors to Dulane, Inc., River Grove, Ill., a corporation of Illinois Application November 28, 1949, Serial No. 129,752

10 Claims. (Cl. 99—403)

This invention relates to an electric deep fat fryer particularly to such a fryer for use in the home and restaurants.

It is an object of the invention to provide a deep fat fryer which is constructed so that there is very little chance of excessive smoking from cooking fried foods.

It is another object of the invention to provide a shell forming a cooking chamber for an electric deep fat fryer, which is designed so that substantially even temperatures prevail throughout the shell.

It is another object of the invention to so dispose the thermostat and heating elements in an electric deep fat fryer that even temperatures are obtained and so that proper control of the temperature of the fat is maintained.

It is another object of the invention to provide a cooking chamber for an electric deep fat fryer which is relatively long and narrow, so that an excessive amount of fat need not be used, and to provide a long narrow well at the bottom of the chamber, wherein particles of food or batter being cooked may fall, thus preventing smoking from said particles.

It is a further object of the invention to provide a cooking chamber for an electric deep fat fryer which has a well at the bottom of the chamber below the heating element or elements wherein the fat is maintained at a slightly lower temperature than the remaining fat in the container so that particles of food or batter being cooked, which fall into the well, do not cause smoking.

It is another object of the invention to provide for a high temperature of the cooking fat, but at the same time to prevent smoking of the fat, which results in very rapid cooking of fried foods.

It is still another object of the invention to provide for operation of the heating element or elements below the flash point of the fat used for cooking and to maintain a low temperature gradient between the heating element and the cooking shell or kettle; and further to provide a cooking shell or kettle of sufficient mass in good heat conducting relation with the heating element, so that no part of the shell or heating element reaches a temperature above the flash point of the fat.

It is a further object of the invention to provide an electric deep fat fryer wherein a low temperature gradient is maintained between all parts of the shell or kettle and the cooking fat.

It is also an object of the invention to maintain the cooking shell and the heating element or elements below the flash point of the cooking fat even if a failure of the circuit elements, including the thermostatic switch, occurs.

It is an additional object of the invention to maintain the temperature of the cooking shell and heating element or elements below approximately 700 degrees F. in an electric deep fat fryer.

It is also an object of the invention to provide a relatively inexpensive outer shell for the deep fat fryer which is pleasing in appearance and is readily assembled.

It is an additional object of the invention to provide a simple means for supporting the basket of the deep fat fryer above the cooking chamber, for draining fat from the food which has been cooked.

With these and other objects in view, our invention consists in the construction, arrangement and combination of the various parts of our electric deep fat fryer, whereby the objects contemplated are attained, as hereinafter more fully set forth, pointed out in our claims and illustrated in the accompanying drawings, wherein:

Figure 1 is a perspective view of the deep fat fryer with the basket in the draining position.

Figure 2 is a partial sectional view of the deep fat fryer showing the basket in the draining position.

Figure 3 is a top view of the deep fat fryer with the cover in position.

Figure 4 is a longitudinal sectional view of the deep fat fryer with the basket removed and the cover in position.

Figure 5 is an end view of the deep fat fryer with portions shown in section.

Figure 6 is a partial elevational view of the inside of the deep fat fryer showing the studs for retaining the basket in the draining position.

Figure 7 is a sectional view of the thermostat and switch taken on line 7—7 of Figure 8.

Figure 8 is a sectional view of the thermostat and switch; and

Figure 9 is a wiring diagram for the unit.

Referring specifically to the drawings for a detailed description of the invention, numeral 12 designates the main body portion of the shell which is preferably formed from a single piece of material suitably welded together. Numeral 13 designates the upper portion of the shell, and it is noted that the portion 13 is provided with an L-shaped flange 7 at the top thereof for a purpose hereinafter described. The lower or base portion of the shell is shown at 14 and both the upper portion 13 and the lower portion 14 are dish-shaped. The formation of the shell 12 and the upper and lower portions 13 and 14 are very important from the standpoint of assembly as will be apparent hereinafter.

The cooking chamber is formed preferably by a cast aluminum shell or kettle of aluminum or other metal of good heat conductivity. The top of the shell is provided with an outwardly extending flange 10 and is preferably cemented or gasketed to the upper portion 13 of the shell at the top thereof as designated by numeral 11. In the fryer shown in the drawing, the shell 15 is relatively long and narrow so that an excessive amount of fat need not be used. In using the fryer the shell should not be more than approximately half filled with fat. The bottom of the shell 15 is rounded and depressed as shown at 16, to provide a long, narrow well 20. The shell is enlarged at points above the well 20 as shown at 17. The functions of the well will be described in detail later in the specification but it is noted that the broad features of construction and the heat exchange principles which are an important part of this invention are equally applicable to fryers and shells of many other shapes and sizes.

Heating elements 21 and 22 extend the length of the shell 15 within the enlarged portions 17 thereof. As best shown in Figure 4, the heating elements are of the usual coiled wire resistance type.

The shell or kettle 15 is also provided with bosses 18 at the bottom thereof and screws 19 extend into the bosses 18 to completely assemble the outer shell 12, 13 and 14 together with the inner shell or kettle 15 without the use of welding or any other fastening means.

In order to assemble the inner and outer shells, the upper portion 13 of the outer shell is inverted over the shell 15 which is also inverted. Flange 7 of the outer shell 13 engages with the underside of flange 10 on kettle 15. Next the main outer shell portion 12 is placed on the shell 13 and an edge 9 thereof is positioned within the edge of the outer shell 13. The bottom portion 14 of the outer shell is then placed on the main outer shell portion 12 encompassing an edge 8 thereof. Screws 19 are then tightened into the bosses 18 drawing the entire assembly together in a rigid manner.

As best shown in Figure 9, power is supplied to the heating elements 21 and 22 from the "Line." The other end of the heating elements are connected by conductors 23 and 24 to the thermostat and switch element, generally indicated by numeral 30.

The thermostat and switch element 30, as best shown in Figures 7, 8 and 9, comprise movable switch arms 25 and 26 to which the conductors 23 and 24 are respectively connected. The switch arm 25 carries a contact 27 and the switch arm 26 carries a contact 28 adapted to engage and disengage with contact 27. A bimetallic thermostatic element is shown at 29 and is positioned close to the end of the case aluminum shell 15 so that it will be readily influenced by the temperature thereof. The switch arm 25 extends above the contact 27 and has a button 31 at its end which is adapted to be engaged by an insulating finger 32 secured to the free end of the element 29. The bimetallic switch arms 25 and 26 are mounted on a suitable insulating block 40 secured to the end of the shell 15 by a suitable screw. As shown in Figure 8, a block 40a between the shell and the bimetallic element 29 is not formed of insulating material, but is formed of metal, so that good heat exchange exists between the shell and the bimetallic element and so that they are structurally and thermodynamically integral.

An adjustment for the control is also mounted on the block 40 and comprises an adjusting knob 33 and a dial 34, which dial is mounted on the end of the outer shell 12. The dial is secured to a shaft 35 which is provided with threads 36 at the end thereof and which rotates in a cooperating threaded block 37. A rod 38 of insulating material is secured to the threaded end of the shaft 35 and engages with the movable switch arm 26. As best shown in Figure 8, the rod 38 extends through an aperture in the switch arm 25.

The operation of the thermostat is as follows: When the knob 33 is turned, it moves the movable switch arm 26 toward or away from the movable switch arm 25. The thermostatic element 29 must, therefore, move a greater or a less distance in moving the switch arm 25 to open or close the contacts 27 and 28. This increase or decrease in distance obviously increases or decreases the temperature required for movement of the thermostatic element 29 through a greater or a less distance. An "off" position is provided at which the thermostatic element 29 cannot move a sufficient distance to close contacts 27, 28.

The basket for cooking the foods is shown at 39 and includes a handle 41. The basket is substantially the same shape and size as the cast aluminum shell 15. The basket is provided with a V-shaped wire member 42 and with a plate 43 having a pair of open slots 50 in the bottom thereof. The shell 15 is provided adjacent one upper end thereof with studs 44 which have enlarged buttons 45 on the ends thereof, which studs extend into the shell 15 for a slight distance. When it is desired to drain the fat from the foods after cooking, the basket may be supported on the studs 44 by dropping the plate 45 with the open slots 50 therein over the studs 44. This will support the basket and the V-shaped wire 42 will prevent the basket from rotating.

A cover 46 provided with a handle 47 is used for covering the cooking container 15 when the fryer is not in use.

The fryer is preferably supported on suitable heat insulating grommets which are secured to the bottom of the outside shell 14.

As stated in the objects, the heat exchange characteristics of the electric deep fat fryer described are a very important part of our invention. In the operation of the fryer, fat is placed in the kettle 15 preferably filling it about half way. The fryer is then connected to the source of electric power and the thermostat is set at the desired temperature. The temperature range shown in the present fryer is from 250 degrees F. to 450 degrees F. After the fat has come up to the desired temperature, the food to be fried which has been placed in the basket 39 is slowly lowered into the fat and is left in the fat for the required time. Because of the fact that the fat is very hot, the cooking time is very fast. In order to attain such a high temperature in an ordinary cooking kettle, a very high fire would be required. This would result in parts of the kettle being above the flash point of the fat. Some of the fat vaporizes and carbonization takes place resulting in excessive smoking. Furthermore, foods nearest the hottest parts of the fat are cooked too much and food in the cooler fat is cooked insufficiently.

In the electric deep fat fryer constructed in accordance with our invention, however, a very even high temperature is maintained throughout the shell 15 and the temperature gradient between the heating elements 21 and 22 and the kettle 15 is very low. Likewise, the temperature gradient between the kettle 15 and the fat contained therein is very low. The fat tends to circulate in the kettle 15 by convection rising from the enlarged portions 17 thereof and descending in the center of the kettle 15 as the fat cools and gravitates to the well 20. The fat in the well 20 is slightly cooler than the remaining fat in the pan, such temperature reduction also being affected by heat radiation from the outside of the well 20. Therefore, particles of food or batter do not smoke.

The heating elements and their contact with the kettle 15 as well as the mass and high heat conductivity of the kettle 15 permit operation of both the heating elements and the kettle 15 below approximately 700 degrees F. and below the flash point of most of the common fats or oils which are used for frying. The coiled wire heating elements 21 and 22 are embedded in heat conducting material 21a and 22a, respectively, which completely fills the chambers in the enlargements 17 of the shell, as shown clearly in Figures 4 and 5. Therefore, the heating elements are structurally and thermodynamically integral with the shell, or kettle 15, and there is no heat conduction by radiation or convection from the heating elements to the kettle. With the heat transfer relationship incorporated in our fryer, it has been found that all elements thereof operate below the flash point of the usual fats or oils even though the level of the fats or oils may be very low and even though the thermostat or some other circuit element fails and the heating elements are operated continuously across the power lines. As stated before, the result of our construction is that foods are fried very rapidly, with practically no smoking, and the fryer is perfectly safe for use in the home because there is no danger of fire.

From the foregoing, it will be apparent that we have provided an electric deep fat fryer which is scientifically designed insofar as the heat exchange principles are concerned and which is very useful in the home. Foods are cooked rapidly without smoking because of the unique design of the fryer.

Some changes may be made in the construction and arrangement of the parts of our machine without departing from the real spirit and purpose of our invention, and it is our intention to cover by our claims such modified forms of structure or use of mechanical equivalents as may be reasonably included within their scope.

We claim as our invention:

1. An electric deep fat fryer comprising a deep cooking kettle for fat, which cooking kettle is formed of heavy metal, a well formed in the bottom of said kettle of less horizontal cross sectional area than the cross sectional area of the major portion of the kettle, electric heating means embedded in the metal forming the upper portion of the well, which electric heating means partially encompasses the well, and a thermostat for controlling the operation of said heating means, said thermostat being mounted in intimate heat conducting relation with said kettle on a vertical portion thereof which is devoid of said electric heating means.

2. An electric deep fat fryer comprising a deep cooking kettle for fat, which cooking kettle is formed of heavy metal, a well formed in the bottom of said kettle of less horizontal cross sectional area than the cross sectional area of the major portion of the kettle, electric heating means embedded in the metal forming the upper portion of the well, which electric heating means partially encompasses the well, and a thermostat for controlling the operation of said heating means, said thermostat being mounted in metal to metal heat conducting relation with said kettle on a vertical portion thereof which is devoid of said electric heating means.

3. An electric deep fat fryer comprising a deep cooking kettle for fat, which cooking kettle is rectangular in shape and is formed of heavy metal, a well formed in the bottom of said kettle of less horizontal cross sectional area than the cross sectional area of the major portion of the kettle, electric heating means embedded in the kettle adjacent the upper portion of the well along two opposite sides of said rectangular kettle and a thermostat for controlling the operation of said heating means, said thermostat being mounted in intimate heat conducting relation on a vertical portion of said kettle which is devoid of said electric heating means.

4. An electric deep fat fryer comprising an outer ornamental shell having a bottom, side walls and an inturned top wall the inner edge of which defines an opening, an inner open topped cooking kettle for fat, which cooking kettle is formed of heavy metal, a well formed in the bottom of said kettle of less horizontal cross sectional area than the cross sectional area of the major portion of the kettle, electric heating means embedded in the metal forming the upper portion of the well, which electric heating means partially encompasses the well, and a thermostat for controlling the operation of said heating means, said thermostat being mounted in intimate heat conducting relation with said kettle on a vertical portion thereof which is devoid of said electric heating means.

5. An electric deep fat fryer comprising a deep cooking kettle for fat, which cooking kettle is formed of heavy metal, a well formed in the bottom of said kettle of less horizontal cross sectional area than the cross sectional area of the major portion of the kettle, electric heating means embedded in the metal forming the upper portion of the well, which electric heating means partially encompasses the well, a thermostat for controlling the operation of said heating means, said thermostat being mounted in intimate heat conducting relation with said kettle on a vertical portion thereof which is devoid of said electric heating means, and an ornamental casing completely surrounding all but the top of the kettle and the thermostat, to provide an insulating air space between said kettle and ornamental casing.

6. An electric deep fat fryer comprising a deep cooking kettle for fat, which cooking kettle is formed of heavy metal, a well formed in the bottom of said kettle of less horizontal cross sectional area than the cross sectional area of the major portion of the kettle, electric heating means embedded in the metal forming the upper portion of the well, which electric heating means partially encompasses the well, and a thermostat for controlling the operation of said heating means, said thermostat being mounted in intimate heat conducting relation with said kettle on a vertical portion thereof which is devoid of said electric heating means, the thickness of the metal of the kettle between the electric heating means and the interior of the kettle being substantially the same as the thickness of the metal in the major portions of said kettle.

7. An electric deep fat fryer comprising a deep cooking kettle for fat, which cooking kettle is formed of heavy metal, a well formed in the bottom of said kettle of less horizontal cross sectional area than the cross sectional area of the major portion of the kettle, electric heating means embedded in the metal forming the upper portion of the well, which electric heating means partially encompasses the well, a thermostat for controlling the operation of said heating means, said thermostat being mounted in intimate heat conducting relation with said kettle on a vertical portion thereof which is devoid of said electric heating means, a food support for containing food to be cooked insertable into said kettle, said food support, at one end thereof, having supporting elements detachably cooperable with said kettle for supporting said food support with its bottom above the fat in said kettle, and portions on said food support depending below said supporting elements and engaging the kettle wall to effect support for the other end of the food support.

8. An electric deep fat fryer comprising a deep cooking kettle for fat, which cooking kettle is formed of heavy metal, a well formed in the bottom of said kettle of less horizontal cross sectional area than the cross sectional area of the major portion of the kettle, electric heating means embedded in the metal forming the upper portion of the well, which electric heating means partially encompasses the well, a thermostat for controlling the operation of said heating means, said thermostat being mounted in intimate heat conducting relation with said kettle on a vertical portion thereof which is devoid of said electric heating means, and a food support for containing food to be cooked insertable into said kettle, said food support and said kettle having cooperating means at only one position on said food support for alone supporting it in a substantially level position above the kettle to afford draining of fat from the food therein.

9. An electric deep fat fryer comprising a deep cooking kettle for fat, which cooking kettle is formed of heavy metal, a well formed in the bottom of said kettle of less horizontal cross sectional area than the cross sectional area of the major portion of the kettle, electric heating means embedded in the metal forming the upper portion of the well, which electric heating means partially encompasses the well, and a thermostat for controlling the operation of said heating means, said thermostat being mounted in intimate heat conducting relation with said kettle on a vertical portion thereof which is devoid of said electric heating means, the electrical input to said heating means and the mass of said kettle being such that the temperature of the kettle cannot exceed approximately 700 degrees F.

10. An electric deep fat fryer comprising a deep cooking kettle for fat, which cooking kettle is formed of heavy metal, a well formed in the bottom of said kettle of less horizontal cross sectional area than the cross sectional area of the major portion of the kettle, electric heating means embedded in the metal forming the upper portion of the well, which electric heating means partially encompasses the well, and a thermostat for controlling the operation of said heating means, said thermostat being mounted in intimate heat conducting relation with said kettle on a vertical portion thereof which is devoid of said electric heating means, said thermostat being designed to maintain a cooking temperature of the fat not exceeding approximately 450 degrees F.

STANLEY J. BUDLANE.
ROBERT DUSEK.

REFERENCES CITED

The following references are of record in the file of this patent:

UNITED STATES PATENTS

| Number | Name | Date |
|---|---|---|
| 566,226 | Reutlinger | Aug. 18, 1896 |
| 596,160 | Helberger | Dec. 28, 1897 |
| 1,046,888 | Stanley | Dec. 10, 1912 |
| 1,064,330 | Hulbert | June 10, 1913 |
| 1,157,100 | Hadaway | Oct. 19, 1915 |
| 1,264,740 | Young | Apr. 30, 1918 |
| 1,388,116 | Monson | Aug. 16, 1921 |
| 1,458,430 | Millner | June 12, 1923 |
| 1,462,224 | Bausert | July 17, 1923 |
| 1,521,031 | MacFarland | Dec. 30, 1924 |
| 1,545,852 | Rohne | July 14, 1925 |
| 1,630,309 | Pitman | May 31, 1927 |
| 1,681,099 | Clark | Aug. 14, 1928 |
| 1,727,842 | Stallworth | Sept. 10, 1929 |
| 1,738,908 | Kuhn et al. | Dec. 10, 1929 |
| 1,820,541 | Paul | Aug. 25, 1931 |
| 1,925,264 | Lomax | Sept. 5, 1933 |
| 1,931,120 | Shroyer | Oct. 17, 1933 |
| 1,994,909 | Ehrgott | Mar. 19, 1935 |
| 2,032,175 | Jones | Feb. 25, 1936 |
| 2,053,568 | Levin | Sept. 8, 1936 |
| 2,070,439 | Legeros | Feb. 9, 1937 |
| 2,109,212 | Ehrgott | Feb. 22, 1938 |
| 2,119,421 | Cross | May 31, 1938 |
| 2,125,862 | Ratcliff | Aug. 2, 1938 |
| 2,128,738 | Blake | Aug. 30, 1938 |
| 2,177,193 | Watts | Oct. 24, 1939 |
| 2,190,844 | Mills | Feb. 20, 1940 |
| 2,194,117 | Graham | Mar. 19, 1940 |
| 2,194,118 | Graham | Mar. 19, 1940 |
| 2,196,486 | Anderson | Apr. 9, 1940 |
| 2,219,949 | Childs | Oct. 29, 1940 |
| 2,265,295 | Layton | Dec. 9, 1941 |
| 2,314,467 | Tubbs | Mar. 23, 1943 |
| 2,337,481 | Lowe | Dec. 21, 1943 |
| 2,338,964 | Pappas | Jan. 11, 1944 |
| 2,340,932 | Chalupa | Feb. 8, 1944 |
| 2,360,727 | Shaw | Oct. 17, 1944 |
| 2,422,974 | Newell | June 24, 1947 |
| 2,440,128 | Sullivan | Apr. 20, 1948 |
| 2,480,337 | Pearce | Aug. 30, 1949 |
| 2,528,776 | Pappas | Nov. 7, 1950 |